United States Patent

Sasaki et al.

Patent Number: 5,834,636
Date of Patent: Nov. 10, 1998

[54] ENGINE CONTROL APPARATUS

[75] Inventors: Shoji Sasaki, Hitachinaka; Mitsuru Watabe, Urizura-machi, both of Japan

[73] Assignee: Hitachi, Ltd., Tokyo, Japan

[21] Appl. No.: 675,674

[22] Filed: Jul. 3, 1996

[30] Foreign Application Priority Data

Jul. 5, 1995 [JP] Japan ................................. 7-169758

[51] Int. Cl.⁶ .............................................. G01M 15/00
[52] U.S. Cl. .......................... 73/117.3; 123/419; 73/35.06
[58] Field of Search ................. 73/35.01, 35.03, 73/35.04, 35.05, 35.06, 116, 117.3; 123/419, 625

[56] References Cited

U.S. PATENT DOCUMENTS

| | | | |
|---|---|---|---|
| 4,300,503 | 11/1981 | Deleris et al. | 73/35.04 |
| 4,334,422 | 6/1982 | Kawai et al. | 73/35.04 |
| 4,478,068 | 10/1984 | Bonitz et al. | 73/35.04 |
| 4,498,331 | 2/1985 | Nakamura et al. | 73/35.04 |
| 5,060,615 | 10/1991 | Hashimoto et al. | 73/35.04 |
| 5,347,846 | 9/1994 | Kitano et al. | 73/35.04 |
| 5,394,330 | 2/1995 | Horner | 73/35.03 |
| 5,400,644 | 3/1995 | Remboski, Jr. et al. | 73/35.04 |
| 5,408,863 | 4/1995 | Sawyers et al. | 73/35.05 |
| 5,460,031 | 10/1995 | Fujishita et al. | 73/35.03 |
| 5,467,638 | 11/1995 | Philipp | 73/35.06 |

FOREIGN PATENT DOCUMENTS

| | | |
|---|---|---|
| 58-45520 | 3/1983 | Japan . |
| 3-47449 | 2/1991 | Japan . |

*Primary Examiner*—George M. Dombroske
*Assistant Examiner*—Eric S. McCall
*Attorney, Agent, or Firm*—Evenson, McKeown, Edwards & Lenahan P.L.L.C.

[57] ABSTRACT

The object of the invention is to provide a low-priced engine control apparatus having a single CPU configuration which can be used for knocking detection and engine control as well, including: an A/D conversion unit which samples, at a predetermined cycle, analog signals of knocking detected and output from a knock sensor; an A/D converter for converting a sampled analog signal to a digital signal in a predetermined conversion time per A/D conversion; a frequency analysis unit which analyzes digital signals upon A/D conversion; a knocking judgment unit which judges the presence of knocking on the basis of a result of the frequency analysis; and a CPU which includes an ignition timing arithmetic unit which executes arithmetic calculation for controlling ignition timing corresponding to knocking on the basis of the judgment so as to ensure an optimum engine control in response to knocking. The predetermined cycle in A/D conversion unit is defined by a period of time which allows for the A/D converter to execute A/D conversion N times, with N being an integer greater than or equal to 2.

8 Claims, 3 Drawing Sheets

ENGINE CONTROL APPARATUS

BACKGROUND OF THE INVENTION

The present invention relates to an engine control apparatus, and in particular, it relates to an engine control apparatus having a knocking detection unit.

When a knock occurs in an engine, an engine oscillation having a characteristic resonance frequency is generated. The presence of knocking is determined by detecting the characteristic resonance frequency as a change in levels of knock signals to be compared with a background oscillation component. Further, in order to improve the precision of knocking detection, a method of detecting a particular resonance frequency using a band pass filter as disclosed in JP-A Laid-Open No. 58-45520 has been known. Further, since the above-mentioned resonance frequency will vary depending on the operating conditions of the engine and the number of cylinders thereof, there is also known a method of improving the precision of knocking detection by sampling knock signals by an A/D converter, then by analyzing a plurality of resonance frequency components by digital frequency analysis as disclosed in JP-A Laid-Open No. 3-47449.

In the above-mentioned prior art, for example, in order to perform the digital frequency analysis of knock signals, it is necessary to sample signals from a knock sensor in a short cycle and at a predetermined sampling frequency and to convert the sampled data from analog to digital signals. Since the sampling cycle is related to a range of frequency analysis, when it is required to cover a range of analysis up to 20 kHz at maximum, for example, as set forth in JP-A Laid-Open No. 3-47449, it is necessary for the sampling cycle for A/D conversion to be set within 25 $\mu$s. Under such circumstances, when an A/D converter having a conversion performance requiring 15 $\mu$s conversion time for every conversion of sampled data is utilized, about 60% of the sampling cycle will be occupied by A/D conversion of knocking detection, therefore, the use of this A/D converter will have to be dedicated to the knocking detection alone.

Therefore, the same A/D converter cannot be applied to processing of signals other than the knock signals during knocking detection. Thus, when a general purpose CPU which includes only one A/D converter is used, this CPU while processing knock signals serves as a dedicated CPU for performing knocking detection. As a result, there arises a problem that at least two sets of CPUs must be installed: one for engine control and the other for knocking detection. In addition, means for data transmission and reception between these at least two CPUs becomes necessary, thus complicating control programs therefore and resulting in an increased cost for the manufacture of engine control apparatus.

An object of the present invention is to provide a new engine control apparatus which has a substantially simplified control program and, is capable of implementing various engine controls including knock detection with a single CPU at a reduced cost of manufacture.

The above-mentioned object of the invention can be accomplished by providing an engine control apparatus which comprises:

a sampling means for sampling at a predetermined cycle an analog signal output from a knock detection means which detects a knocking of the engine;

a single A/D converter means for converting the above-mentioned sampled analog signal into a digital signal, which spends a predetermined conversion time for every A/D conversion;

a frequency analysis means for analyzing the digital signal after digital conversion;

a knock determination means for determining whether or not the knocking exists on the basis of a result of analysis by the frequency analysis means; and a microcomputer including an ignition calculation means for calculating an appropriate ignition control timing on the basis of determination by the knock determination means in response to the knocking; wherein the predetermined cycle of sampling by the sampling means is set at an interval of time which allows for the A/D conversion means to carry out A/D conversion N times (N: integer 2 or more) therein so that an appropriate engine control is executed in response to the knocking.

Further, the engine control apparatus to accomplish the object of the invention may be comprised as well by:

a single A/D conversion means for converting an input analog signal into a digital signal, which conversion requires a predetermined conversion time t1 ($\mu$s) for every A/D conversion;

a sampling means for sampling a predetermined analog signal indicative of a predetermined engine condition of the engine to be output to the aforementioned A/D conversion means, the sampling being conducted at a predetermined cycle t2 ($\mu$s) such that it allows the A/C conversion means to execute A/D conversion N times (N: integer 2 or greater);

another sampling means for sampling another analog signal indicative of any other engine conditions of the engine other than the aforementioned predetermined engine condition of the engine to be output to the A/D conversion means, the another sampling being conducted in an unoccupied period of time (t2−t1) such that sampling does not overlap in time between the aforementioned sampling means and the another sampling means; and a microcomputer including a control calculation means which calculates a control input to control the engine operation condition at optimum on the basis of a predetermined digital signal or another digital signal which is sequentially converted within time t2 from the predetermined analog signal and the another analog signal by the A/D converter means, each signal conversion taking time t1, thereby the operation condition of the engine is controlled optimally in response to the predetermined engine condition or the any other engine conditions of the engine.

In other words, since A/D conversion can be performed twice within a time slot of a sampling cycle allocated for the sampling of knock signals according to the arrangement of the invention described above which takes into account the predetermined sampling cycle and the predetermined conversion time required for A/D conversion, additional A/D conversion processing for processing another signal other than the knock signal which is also required for the control of the engine can be executed by a single A/D conversion device. Thereby, a dedicated CPU is not needed for knocking detection, thus, a single CPU unit can serve as a total engine control CPU. More specifically, this can be implemented by selecting an A/D converter in which the required transformation period of time is determined such that an analytical range for the frequency analysis device can cover a minimum adequate extent of frequency analysis spectrum which is sufficient for, and does not affect, the precision of knocking detection. This is so that the transformation can be allowed to be executed two or more times within a sampling period which is determined by the minimum adequate extent of the frequency analysis spectrum.

Now, with reference to FIGS. 5 and 6, problems associated with the prior art will be discussed in detail in the following.

FIG. 5 is a schematic block diagram of a prior art engine control apparatus. Namely, the drawing of FIG. 5 illustrates an engine control apparatus comprising two CPUs including a dedicated CPU for knocking detection. Engine control unit 1 comprises main CPU 30 which computes a fuel injection quantity, ignition timing and the like to optimize the operational condition of the engine, sub CPU 31 which serves as a microprocessor for detecting knocking, and transmission/reception means 32 for data exchange. In response to signals from air flow sensor 5 and crank angle sensor 6, main CPU 30 executes an arithmetic operation for fuel injection control and ignition control using A/D converter 33 and the like which are built therein, and outputs control signals to fuel injection unit 9 and ignitor 10, on the other hand, in response to signals from crank angle sensor 6 and knock sensor 4, sub CPU 31 determines the presence of knocking using A/D converter 34 and the like which are built therein.

With reference to FIG. 6, there is shown a schematic block diagram indicative of a program processing using a two CPU configuration according to the prior art. In main CPU 30, a signal from air flow sensor 5 is converted to a digital signal in A/D converter 33 by program processing in A/D converter unit 40, and is output to fuel calculation unit 42 and ignition timing calculation unit 43. Simultaneously, a signal from crank angle sensor 6 is input to rotation detection unit 41, and a result of processing therein is likewise output to fuel calculation unit 42 and ignition timing calculation unit 43. Each calculation unit outputs the result of its calculation as a control signal to the fuel injector and the ignition unit, respectively. Then, ignition timing calculation unit 43, upon the reception of information indicating whether a knock is present or not which is obtained in CPU 31 through transmission/reception unit 32 and bus buffer 44, is adapted to execute calculation for ignition control on the basis of the information received.

In sub CPU 31, a knock signal from knock sensor 4 is converted to a digital signal in A/D converter 34 by program processing in A/D conversion unit 46, and the result of which is analyzed in frequency analysis unit 47. Subsequently, BGL signal 48a which is an average value averaged in BGL unit 48 is compared with an analysis value from frequency analysis unit 47 in knock determination unit 49 to determine whether a knock exists or not. In order for the frequency analysis unit 47 to be able to count a timing to start frequency analysis, the signal from crank angle sensor 6 is input to frequency analysis unit 47 via rotation detection unit 45. Further, in order to allow for frequency analysis unit 47 to determine its frequency analysis section, another signal from crank angle sensor 6 via another route from rotation detection unit 41, bus buffer 50 and the like is also input to frequency analysis unit 47.

By way of example, since knocking occurs in synchronism with engine rotation, the timing of data transmission and reception between these two CPUs must also be synchronized with the engine rotation. Timing of crank angle sensor 6 is utilized separately by both of the CPUs to obtain their timing, respectively. However, in order to avoid a risk of deviation or mismatching in timing between these two CPUs, which occurs when taken separately, adjustment of timing is insured by the timing from crank angle sensor 6 which is obtained through the different route described above. Data transmission and reception of information on knock determination and timing are performed between these two CPUs in the manner described above, thereby substantially complicating configurations of data transmission and reception and programs therefore.

In addition, since the specification of output signals from crank angle sensor 6 will differ in accordance with the engine type the fuel injection control method, the ignition control method and the like, it becomes necessary to change the program for data transmission and reception depending on the signal specification thus determined. Thereby, there is such a problem that any common program that can be shared by different types of knocking detection CPUs cannot be obtained, thus limiting the versatility of the program.

Therefore, the main object of the present invention is to substantially simplify the prior art two CPU configuration which requires complicated data transmission and reception processing, and provide a simple and versatile program suitable for general-purpose application.

BRIEF DESCRIPTION OF THE DRAWINGS

The above and other objects and features of the invention will appear more fully hereinafter from a consideration of the following description taken in connection with the accompanying drawing in which.

DETAILED DESCRIPTION OF THE PREFERRED EMBODIMENTS

Figure 1:
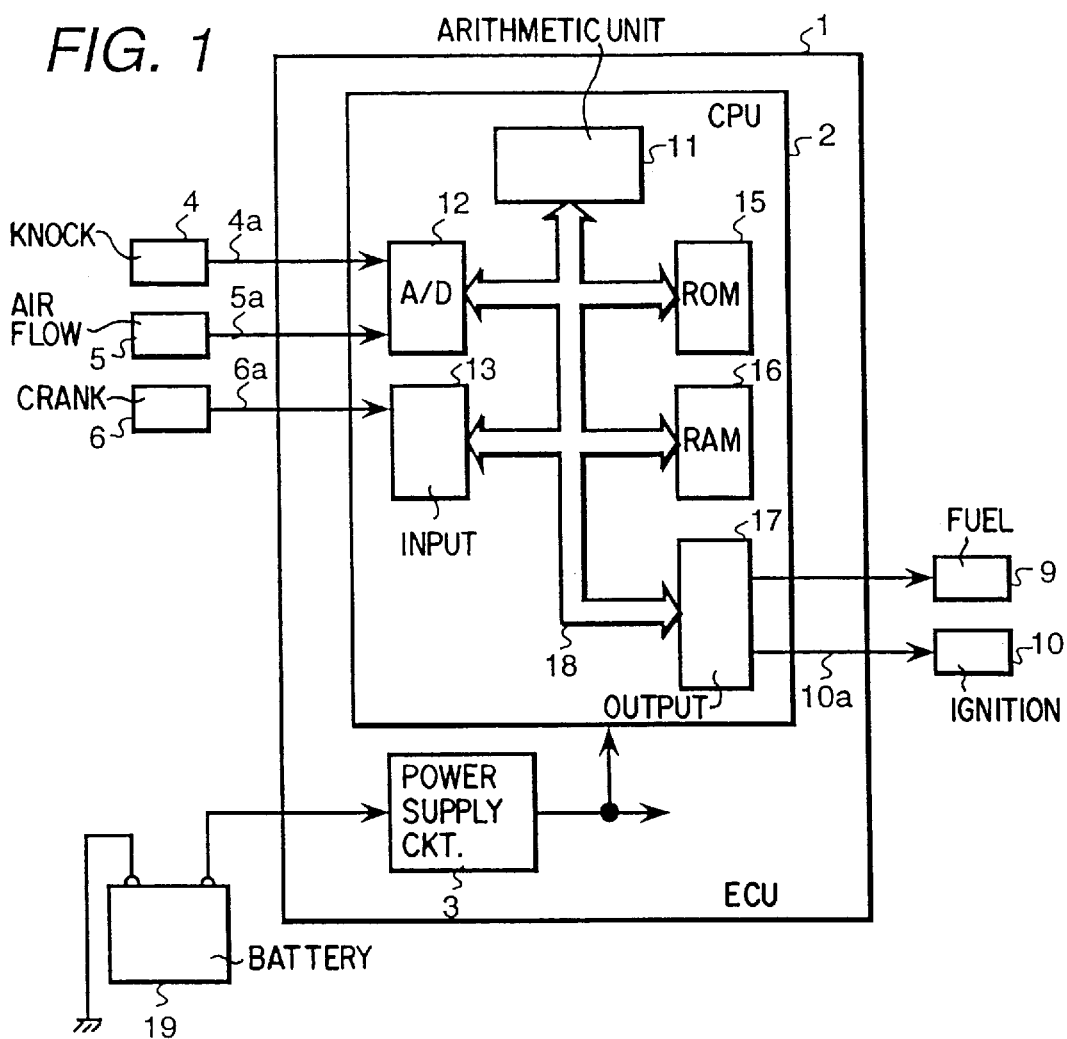
FIG. 1 is a schematic block diagram of an engine control apparatus of one embodiment of the invention.

With reference to FIG. 1, there is depicted a schematic block diagram of an engine control apparatus of one embodiment of the invention. Namely, there is depicted an engine control unit comprising a single CPU without the use of any other dedicated CPU for knocking detection. The configuration thereof is given in the following.

Figure 6:
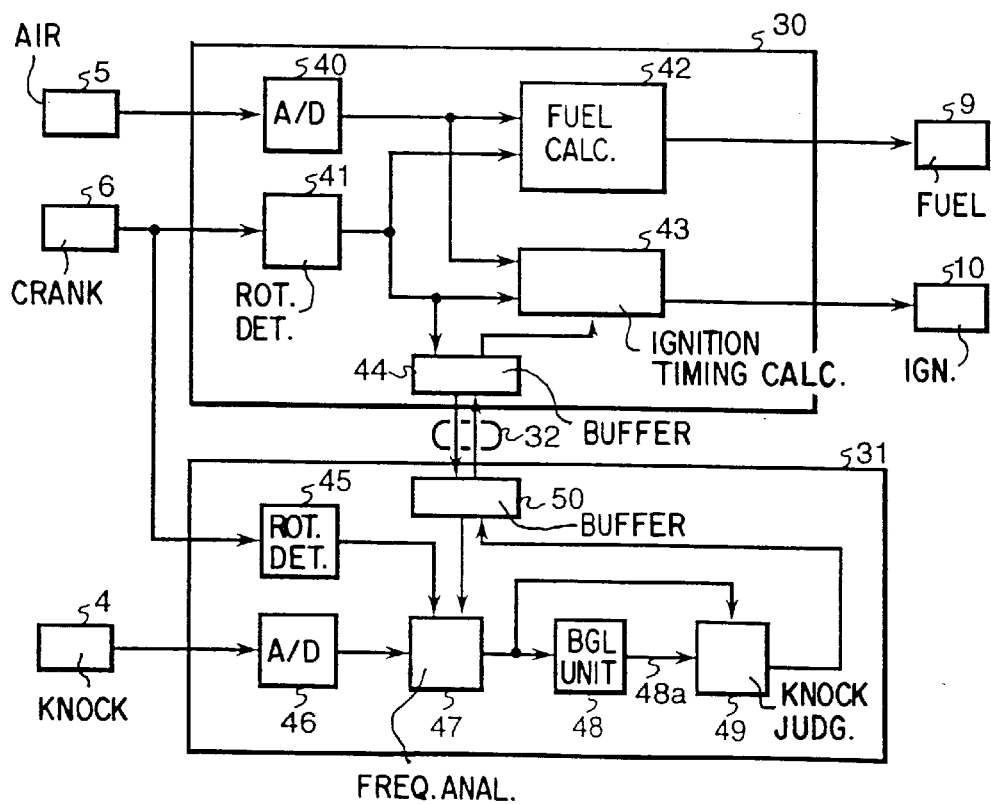
FIG. 6 is a block diagram indicating program processing in the prior art configuration having two CPUs.

Engine control unit 1 includes CPU 2 given as a microcomputer and power supply circuit 3 which supplies power to CPU 2 and the like by stepping down or boosting power from battery 19. CPU 2 is comprised of arithmetic unit 11 which executes various control calculations, ROM 15 which stores programs for such arithmetic calculations, RAM 16 which stores the results of such calculations, A/D converter 12 given as a single A/D converter means for converting analog signals from knock sensor 4 and air flow sensor 5 to digital signals, input unit 13 which inputs a digital signal from crank angle sensor 6 or the like, an output unit 17 which outputs a control signal to fuel injection unit 9 and ignition unit 10, and bus 18 which interconnects each element described above. Both of the A/D converters 33 and 34, which are provided singularly in either of CPUs in the two CPU configuration of the FIG. 6, are incorporated into a single unit of A/D converter 12. The operation thereof will be described in detail in the following.

Engine control unit 1, in response to signals from a group of sensors provided for detecting various engine conditions which are not shown in the drawing, the signals from the group of sensors including those from knock sensor 4 for detecting occurrence of knocking, air flow sensor 5 for detecting suction air flow into the engine and crank angle sensor 6 for detecting engine rotation, computes control signals for supplying an optimum fuel injection quantity to the engine to be output to fuel injection unit 9, and an optimum ignition timing to be output to ignition unit 10 likewise so that an optimum engine operational condition is maintained.

Figure 2:
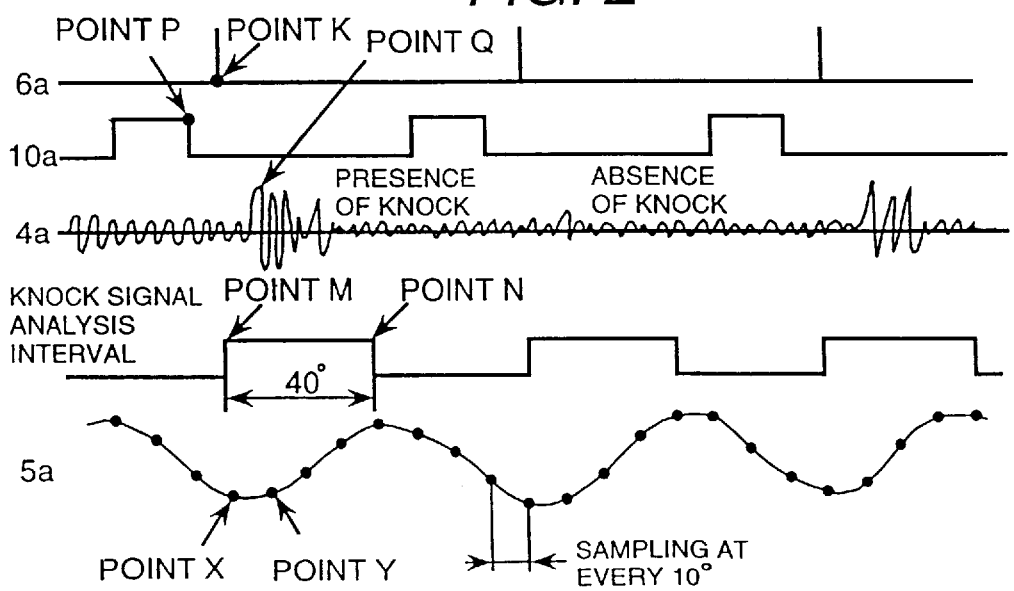
FIG. 2 is a timing chart indicating operation of the engine control apparatus of FIG. 1.
Figure 3:
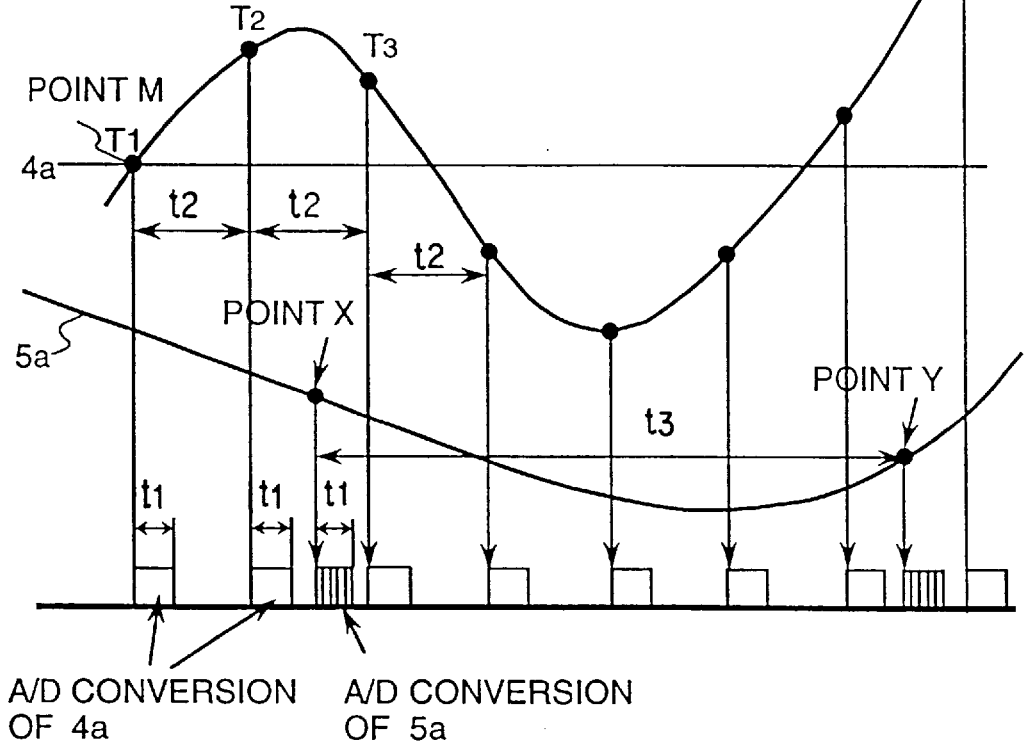
FIG. 3 is a timing chart indicating A/D conversion operation according to the invention.

With reference to FIGS. 2 and 3, operation of the engine control unit 1 will be set forth in detail.

FIG. 2 is a timing chart indicating the operation of the engine control apparatus of FIG. 1. Crank angle sensor signal 6a from crank angle sensor 6, which serves as a reference signal for various controls, is generated when a piston of the engine reaches a predetermined angle. Then, using the reference signal, ignition signal 10a, for example, is output from engine control unit 1. Knock signal 4a from knock sensor 4, which is a detection signal representing the whole vibration components of the engine which includes a steady-state vibration signal referred to as a background signal while the engine is operating, is input to engine control unit 1.

When knocking of the engine occurs, the level of knock signal increases greater than that without knocking. Namely, as indicated in FIG. 2, there occurs a great change in knock signal 4a when knocking arises, and the timing of the occurrence thereof comes after the output of ignition signal 10a, more specifically, after the piston arrives at its top dead center position. Now, it is known that the position of occurrence of knocking (point Q) is concentrated in a range of predetermined angles of engine rotation, i.e., between ATDC 10° to ATDC 50°.

Therefore, according to this embodiment of the invention, a point at which the reference signal of crank angle sensor 6a is to be generated is set at ATDC 10° (point K), then an interval to analyze knock signal 4a (analysis section) is set within a section of 40° between ATDC 10° and ATDC 50°, starting counting from point K. A sampling section for allowing A/D conversion of knock signal 4a is limited to this analysis section. By way of example, ATDC (After Top Dead Center) refers to a rotation angle relative to the top dead center of the piston. A point where ATDC=0° indicates the top dead center.

On the other hand, airflow sensor signal 5a which is required to be input in addition to knock signal 4a, which also requires A/D conversion, is sampled at every 10° angle to execute the A/D conversion. At this instant, the sampling of airflow sensor signal 5a is executed asynchronous with the sampling of knock signal 4a as will be described later.

FIG. 3 is a timing chart which indicates the operation of A/D conversion according to the invention. Namely, the drawing of FIG. 3 depicts sampling timing of A/D conversion to be executed in CPU 2. Sampling of knock signal 4a is carried out during the above-mentioned analysis section (between points M and N) taking a predetermined cycle time $t2$ (hereinafter referred to as a sampling cycle). Then, A/D converter 12 converts sampled knock signal 4a to a digital signal in a predetermined time $t1$ required for each A/D conversion.

That is, CPU 2 starts a first sampling of knock signal 4a at time T1, the A/D conversion of which first sampling is executed in time $t1$. Then, at time T2 after time $t2$, a second sampling thereof is carried out, and the A/D conversion of which second sampling is likewise executed in time $t1$. This cycle of sampling and A/D conversion is repeated during the period of the analysis section. As clearly shown in FIG. 3, there exists an unoccupied period of time between each A/D conversion and a subsequent sampling timing. The unoccupied period of time corresponds to time $(t2-t1)$.

If the above unoccupied time is defined by the following formula 1, $$(t2-t1)<t1 \qquad \text{(formula 1)},$$

and if A/D conversion of "another signal" is adapted to be executed in time $t1$ in the same time slot $t2$, then at time T2 which depicts timing for the next sampling of knock signal 4a, since A/D conversion of the "another signal" is still being executed, the subsequent sampling of knock signal 4a cannot be initiated. When sampling timing is shifted as above, it results in a change of sampling cycles as set forth in JP-A Laid-Open No. 3-47449, which causes an error in the result of the frequency analysis. Further, when A/D conversion of knock signal 4a is forcibly started while A/D conversion of the another signal is being executed, an error will occur in the result of the A/D conversion. In consequence, an abnormal signal will be output leading to a malfunctioning or the like of the engine. Therefore, in the case where the unoccupied time holds formula 1, any signal other than knock signal 4a cannot be applied to an A/D conversion within conversion time $t1$, thereby substantially requiring use of a dedicated A/D converter for knock signal 4a.

By way of example, there will be no problem if such A/D conversion can be executed in time $t0$, where $t0<(t2-t1)$, however, in practice, time $t1$ required for each conversion is set at a shortest value available in a corresponding system. Therefore, logically speaking, there exists no $t0$, and if it does exist, it calls for two A/D converters having $t0$ and $t1$ respectively, which will not be in the scope of the invention directed to a CPU configuration having a single A/D converter.

Next, if the above-mentioned unoccupied time holds that $$(t2-t1) \geq t1 \qquad \text{eq. 2,}$$

it becomes possible to carry out two or more A/D conversions each conversion taking a predetermined conversion time $t1$, during each sampling cycle of knock signal 4a. In other words, it becomes possible for another analog signal other than knock signal 4a to be sampled and converted to a digital signal during each analysis section for knock signal 4a utilizing the same A/D converter. Namely, the embodiment of FIG. 3 illustrates that the single A/D converter 12 executes analog-to-digital conversion both of sampled knock signal 4a and another signal of airflow sensor signal 5a which is sampled at a different sampling timing from that of the knock signal.

In order to implement such conversion, when airflow sensor signal 5a is to be sampled, for example, at every 10° in synchronism with the engine rotation angle, the sampling timing of which is adapted to fall within the analysis section for knock signal 4a, an A/D conversion of airflow sensor signal 5a is adapted to be executed in the unoccupied time within the sampling cycle of knock signal 4a.

That is, there holds equation 3 which is obtained by modifying equation 2, $$t2 \geq 2 \times t1 \qquad \text{equation 3.}$$

Thus, it has become possible to sample another signal other than knock signal 4a for digital conversion within the analysis section initially allocated for knock signal 4a using the same A/D converter. In other words, by arranging for equation 3 to hold true additional time to allow for another or several more A/D conversions to be executed in an interval after the A/D conversion of knock signal 4a and before the next sampling timing is ensured according to the embodiment of the invention.

Further, there will be described in the following a specific method of an embodiment of the invention for allowing another sampling device to sample a different analog signal of airflow sensor signal 5a other than knock signal 4a in such a manner that the sampling timing of the another sampling device is set asynchronous with the sampling timing of the knock signal, namely, both sampling timings will not overlap since the another sampling is taken in an unoccupied interval (t2-t1).

As indicated in FIG. 3, point X, at which sampling of airflow sensor signal 5a starts, lies in an unoccupied interval of (t2-t1) and is set at a point apart by a predetermined angle (or time) from point M at which sampling of knock signal 4a starts so that point X does not overlap with the end point of knock signal conversion time t1. Then, a sampling cycle for airflow sensor signal 5a defined between points X and Y having a predetermined cycle t3 ($\mu$s) satisfies the following equation 4, $$t3=M>t2 \qquad \text{eq. 4,}$$

where M is an integer greater than 1.

With respect to a relationship between the sampling cycle of knock signal 4a and its digital frequency analysis, when the sampling cycle (t2) of knock signal 4a is assumed to be, for example, 25 $\mu$s as disclosed in JP-A Laid-Open No. 3-47449, a maximum frequency Sb (kHz) in a range which can be analyzed in frequency analysis unit 47 becomes 20 kHz as follows, $$Sb=1/(2\times t2\times 10^{-6}) \qquad \text{eq. 5.}$$

In this case, when the time (t1) required for conversion by A/D converter is assumed to take 15 $\mu$s, it falls in the condition of formula 1, therefore, A/D conversion is not allowed for any other signal within the sampling cycle of knock signal 4a, thus, eventually, a CPU dedicated for knocking detection is required.

However, in practice, the resonance frequency representing knocking of the engine is determined substantially by a diameter of the piston of the engine, and its resonance frequency Sk is known to be less than 15 kHz in most automotive engines. Therefore, it can be concluded that frequency analysis unit 47 is not required to cover a frequency range of analysis up to 20 kHz, and that it is adequate to cover a range up to 15 kHz. Namely, maximum frequency Sb can be set at 15 kHz in automobile engines. If the frequency range for digital frequency analysis is limited up to 15 kHz, the above-mentioned sampling cycle t2 can be calculated to be 33 $\mu$s. Thereby, with the above sampling cycle t2=33 $\mu$s, there exists the condition of equation 3, thereby allowing for the A/D converter to take sampling twice, each requiring conversion time t1=15 $\mu$s.

That is, when an engine control including knocking detection is desired to be made for automobile engines, such engine control apparatus can be implemented in an arrangement having a single CPU configuration which utilizes frequency analysis unit 47, the maximum frequency Sb of which is set at 15 kHz and a normal type A/D converter having a conversion time t1=15 $\mu$s, without impeding the precision of knocking detection, and ensuring analog-to-digital conversion of knock signal 4a and, for example, airflow sensor signal 5a within the sampling cycle allocated for knock signal 4a.

As described hereinabove, since it is directed in particular to knocking detection in automobile engines, by limiting the maximum frequency Sb to 15 kHz and the conversion capability of the A/D converter to that of the normal type, it has become possible advantageously to carry out twice the A/D conversion within each sampling cycle utilizing a single low-priced CPU having a rather low processing speed.

However, with respect to general types of engines, the maximum frequency Sb and the required conversion time t1 therefore are not limited to those described above, and many other modifications thereof will be applied within the scope of the invention. That is, any maximum frequency Sb of the frequency analysis device that can be analyzed, any A/D converter having a shorter conversion time, and any CPU having a greater throughput and capacity can be selected freely within the scope of the invention.

Therefore, in the case of the above-mentioned any type of CPU having a relatively high price tag, there will hold equation 6.

$$t2 \geq N \times t1 \qquad \text{eq. 6}$$

where N is an integer greater than 2.

This is true even if sampling cycle t2 is 33 $\mu$s, when required conversion time t1 is 10 $\mu$s and integer N=3. Further, according to a frequency analysis range to be selected, it is also possible to set N=4, 5, . . . Then, if N=3, allocating one conversion time available of N to conversion of knock signal 4a which is one of the predetermined analog signals indicating predetermined engine conditions, and the rest of the conversion times of N can be allocated to conversion of other analog signals indicating the other engine conditions other than knocking as described above such as airflow sensor signal 5a for detecting airflow rate to the engine, engine cooling water detection signal and the like. In this case, the processing of other sampling devices for sampling other analog signals to be output to A/D conversion devices and of control computing devices for executing computation for optimally controlling the engine conditions are included in program processing of arithmetic unit 11 in CPU 2.

Figure 4:
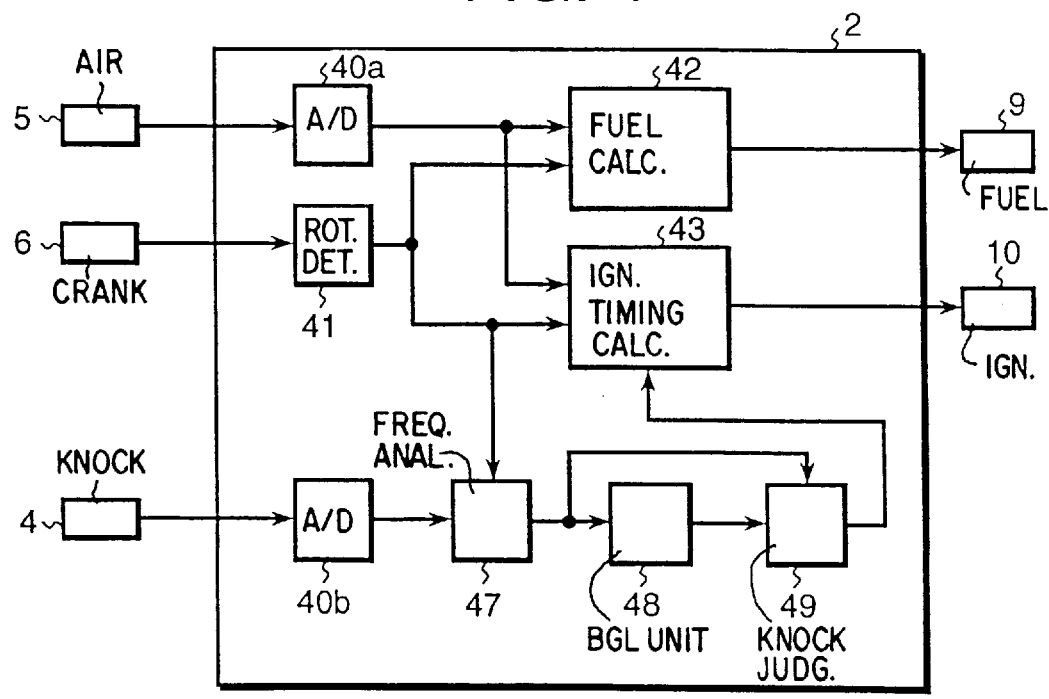
FIG. 4 is a schematic block diagram indicating a configuration comprising a single CPU according to the invention.
Figure 5:
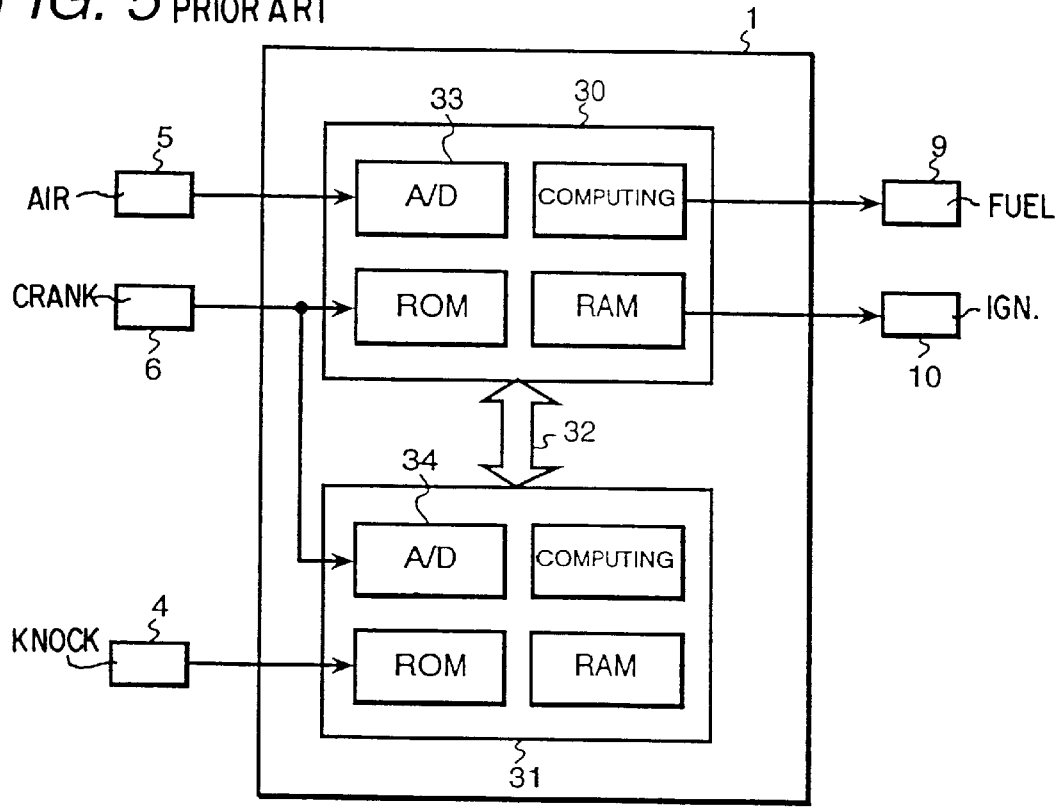
FIG. 5 is a block diagram indicating the configuration of a prior art engine control apparatus.

FIG. 4 is a schematic block diagram indicating a program processing by a single CPU configuration according to the invention. The main difference of the single CPU configuration of the invention from the prior art two CPU configuration of FIG. 6 is that main CPU 30 and sub CPU 31 of the latter are substituted by a single CPU 2 of the former. A/D converter units 40 and 46 disposed separately in each CPU in the prior art are substituted by A/D converter units 40a and 40b which are included in the single CPU 2 of the invention. Further, transmission/reception unit 32, bus buffers 44 and 45, and rotation detection unit 45 of the prior art are omitted.

Namely, with reference to FIGS. 1 and 4, CPU 2 of the invention comprises at least one A/D converter 12; A/D converter 40b serving as a first sampling means and A/D converter 40a serving as a second sampling means for sampling another type of signal, both converters being coupled to the A/D converter 12; frequency analysis unit 47 provided as means for analyzing knock frequency; BGL unit 48 and knock judgment unit 49 both in conjunction functioning as a knock judgment means; and ignition arithmetic unit 43 given as ignition arithmetic means.

The other processings in fuel injection arithmetic unit 42 and ignition arithmetic unit 43 and in the knocking detection unit itself are the same as described with respect to the two CPU configuration of FIG. 6. However, although in the prior art two CPU configuration the data to determine a specific timing when to start and end the analysis is transmitted from main CPU 30 to sub CPU 31 via bus buffer 50, in this single CPU configuration the frequency analysis unit 47 which analyze the digital signal receives the above-mentioned timing data directly from rotation detection unit 41. Since such data transmission and reception is executed within the same single CPU configuration, a highly reliable and economical data transmission and reception without disturbance is achieved.

Further, with respect to transmission of information indicating the presence of knocking, which is required by ignition arithmetic unit 43, and is exchanged between main CPU 30 and sub CPU 31 in the prior art two CPU configuration, such exchange of information between two CPUs is no longer required in the single CPU configuration of the invention since it can be executed internally. That is, since data required for digital frequency analysis and ignition timing control computation to be executed on the basis of a result of the digital frequency analysis (such data includes data from rotation detection unit 41 to frequency analysis unit 47 and data from knock judgment unit 49 to ignition arithmetic unit 43) can be read from the single CPU without carrying out data exchange with the external unit, the program of the single CPU configuration will become substantially simplified. Still further, there are other advantages in that control deviation likely to arise between two CPUs is eliminated because of a single CPU configuration. Further there is no need to change the program according to signal specifications of crank angle sensor 6. Also the program can be substantially simplified so as to be suitable for versatile applications.

According to the invention, there is such an advantage that the prior art two CPU configuration for an engine control apparatus can be substituted by a single CPU configuration for the engine control apparatus which eliminates the use of a CPU dedicated to knocking detection, thereby eliminating data exchange between CPUs, thus simplifying the control program.

There is another advantage that since it has a single CPU configuration, a low-priced more economical engine control apparatus can be provided.

There is still further advantage that since the space the CPU occupies on a substrate is substantially reduced, a more compact and light-weight engine control apparatus can be provided, eventually contributing to the improvement in gas/mileage due to the light-weight control apparatus.

What is claimed is:

1. An engine control apparatus comprising:

a means for sampling an analog signal at a predetermined cycle, the analog signal indicating knocking in an engine;

a single A/D conversion means for converting said analog signal sampled to a digital signal, each A/D conversion taking a predetermined conversion time;

a frequency analysis means for analyzing said digital signal upon A/D conversion thereof;

a knock judgment means for judging whether or not said knocking is present on the basis of a result of analysis by said frequency analysis means; and a microcomputer including a means for computing ignition timing for ignition control corresponding to said knocking on the basis of judgment by said knock judgment means; wherein said predetermined cycle in said sampling means is set to have an interval of time to allow for said A/D conversion means to carry out N times A/D conversion within said predetermined cycle such that an optimum engine control can be executed corresponding to said knocking, N being an integer greater than or equal to 2.

2. An engine control apparatus comprising:

a means for sampling an analog signal at a predetermined cycle, the analog signal indicating knocking in an engine;

a single A/D conversion means for converting said analog signal sampled to a digital signal, each A/D conversion taking a predetermined conversion time;

a frequency analysis means for analyzing said digital signal upon A/D conversion thereof;

a knock judgment means for judging whether or not said knocking is present on the basis of a result of analysis by said frequency analysis means; and a microcomputer including a means for computing ignition timing for ignition control corresponding to said knocking on the basis of judgment by said knock judgment means; wherein said predetermined cycle in said sampling means is set to have an interval of time to allow for said A/D conversion means to carry out N times A/D conversion such that an optimum engine control can be executed corresponding to said knocking, N being an integer greater than or equal to 2;

wherein said means for sampling includes:

a first sampling means for sampling a first analog signal representing a first condition of an engine to be output to said A/D conversion means, said sampling being carried out in a predetermined cycle $t_2$ ($\mu s$) which allows said A/D conversion means to execute analog-to-digital conversion N times (N: an integer greater than or equal to 2); and a second sampling means for sampling a second analog signal representing a second condition of the engine to be output to said A/D conversion means, said sampling of said second analog signal being carried out in an unoccupied time ($t_2-t_1$) to avoid overlapping with the sampling of the first analog signal; and further wherein said microcomputer further includes a control computation means for executing computation for controlling said engine in an optimum condition on the basis of a first digital signal converted from said first analog signal and a second digital signal converted from said second analog signal which are input into said A/D conversion means sequentially in said time interval $t_2$ for each sequential conversion taking said time $t_1$; whereby an operating condition of said engine is controlled in an optimum condition in response to said first engine condition and said second engine condition.

3. An engine control apparatus, comprising:

an analog signal sampler having a predetermined sampling cycle, said sampler receiving an analog engine vibration signal;

a single A/D converter which receives a sampled analog signal output from said sampler and provides a digital signal output, said single A/D converter having a predetermined conversion time for each A/D conversion;

a frequency analyzer which receives the digital signal output from said single A/D converter;

means for judging whether knocking is present on a basis of an output from said frequency analyzer;

a microcomputer providing an ignition control signal based on a computed ignition timing in response to an output from said knock judgment means;

wherein said predetermined cycle in said sampler has an interval of time which allows said A/D converter to perform said A/D conversion more than once within said predetermined sampling cycle such that an optimum engine control can be executed for a knocking situation.

4. An engine control apparatus, comprising:

an analog signal sampler having a predetermined sampling cycle, said sampler receiving an analog engine vibration signal;

a single A/D converter which receives a sampled analog signal output from said sampler and provides a digital signal output, said single A/D converter having a predetermined conversion time for each A/D conversion;

a frequency analyzer which receives the digital signal output from said single A/D converter;

means for judging whether knocking is present on a basis of an output from said frequency analyzer;

a microcomputer providing an ignition control signal based on a computed ignition timing in response to an output from said knock judgment means;

wherein said predetermined cycle in said sampler has an interval of time which allows said A/D converter to perform said A/D conversion more than once such that an optimum engine control can be executed for a knocking situation;

wherein said analog signal sampler includes
a first sampler which operates on a first analog signal representing a first condition of an engine, said first sampler providing a first sampled output to said A/D converter, said first sampler having a predetermined sampling cycle $t_2$ which allows said A/D converter to execute analog-to-digital conversion more than once; and a second sampler which receives a second analog signal representing a second condition of the engine, said second sampler providing a second sampled output signal to said A/D converter, said second sampler operating to perform said sampling in an unoccupied time period ($t_2-t_1$) to avoid overlapping with said sampling of said first analog signal; and further wherein
said microcomputer provides an engine control output on a basis of a first digital signal converted from said first analog signal and a second digital signal converted from said second analog signal, said first and second analog signals being input into said single A/D converter sequentially during said time interval $t_2$ for each sequential conversion taking said predetermined conversion time $t_1$.

5. An engine control apparatus, comprising:

(a) a sensor detecting an analog signal including vibration of an engine and sampling said analog signal in a predetermined period of $t_2$;

(b) an A/D converter receiving the sampled analog signal and converting said sampled analog signal to a digital signal, said A/D converter having a converting period of $t_1$;

(c) a frequency analyzer receiving said digital signal;

(d) a knock determination unit determining an occurrence of knocking based on a frequency analysis of said digital signal; and (e) a microcomputer which computes an optimum ignition timing for an engine responsive to said occurrence of knocking, wherein said predetermined period of $t_2$ and said converting period of $t_1$ are defined by $t_2 \geq$ to $N.t_1$, where N is an integer such that said A/D converter is capable of executing A/D conversion N times of $t_1$ within said predetermined period of $t_2$.

6. An engine control apparatus according to claim 5, wherein said sensor includes:

a first sensor for sampling a first analog signal representing a first condition of the engine in a sampling period of $t_2$ so as to allow said A/D converter having the converting period $t_1$ to execute N A/D conversions within said sampling period of $t_2$;

a second sensor for sampling a second analog signal representing a second condition of the engine different from said first condition in a sampling period $t_2-t_1$ so as to avoid overlapping with the A/D conversion of the first analog signal; and wherein
said microcomputer further includes a control computation means for computing optimum engine parameters for optimizing engine operation responsive to said first engine condition and said second engine condition on a basis of first and second digital signals from said A/D converter.

7. An engine control apparatus, comprising:

(a) a sensor for sampling an analog signal including vibration of an engine in a predetermined period of $t_2$;

(b) a single A/D converter which converts said analog signal and provides a digital signal output, said single A/D converter having a converting period of $t_1$;

(c) a frequency analyzer which receives said digital signal output and provides frequency analysis thereof;

(d) a knock determination unit for determining an occurrence of knocking from said frequency analysis of said digital signal output; and (e) a microcomputer which computes optimum ignition timing for an engine responsive to said occurrence of knocking, wherein
said predetermined period of $t_2$ and said converting period of $t_1$ are defined such that $t_2 \geq N.t_1$, where N is an integer such that said single A/D converter may execute N A/D conversions of conversion periods $t_1$ within said predetermined period of $t_2$.

8. The engine control apparatus according to claim 7, wherein said sensor for sampling includes:

a first sensor for sampling a first analog signal representing a first condition of the engine in a sampling period of $t_2$ so as to allow said single A/D converter to execute N A/D conversions having a converting period $t_1$;

a second sensor for sampling a second analog signal representing a second condition of the engine different from said first condition in a sampling period $t_2-t_1$ so as to avoid any overlap with the A/D conversion of the first analog signal; and wherein
said microcomputer further includes a control computation means for computing optimum engine parameters for optimizing engine operation responsive to said first engine condition and said second engine condition on a basis of first and second digital signals from said signal A/D converter.

* * * * *